United States Patent [19]

Hug

[11] Patent Number: 4,569,248
[45] Date of Patent: Feb. 11, 1986

[54] COUPLING ARM FOR TRANSMITTING LINEAR MOTION

[75] Inventor: Paul Hug, Santa Clara, Calif.

[73] Assignee: Storage Technology Partners, Louisville, Colo.

[21] Appl. No.: 542,927

[22] Filed: Oct. 18, 1983

[51] Int. Cl.⁴ .............................................. G05G 1/00
[52] U.S. Cl. ........................................ 74/581; 74/586
[58] Field of Search .................. 74/519, 581, 584, 586

[56] References Cited

U.S. PATENT DOCUMENTS

| | | | |
|---|---|---|---|
| 136,690 | 3/1973 | Aufdembrinke | 74/584 |
| 1,394,784 | 10/1921 | Pearson | 74/581 |
| 2,428,743 | 10/1947 | Roxberg | 74/584 |
| 2,837,934 | 6/1958 | Edmundson | 74/586 |
| 2,895,345 | 7/1959 | McClure | 74/584 |

Primary Examiner—Kenneth J. Dorner
Attorney, Agent, or Firm—Bryant R. Gold; James R. Young

[57] ABSTRACT

A coupling arm for coupling a driving mechanism to a mechanism to be driven is presented. The arm includes a length of suitable rigid material with flexure points selectively formed therein. The flexure points allow the coupling arm to transmit a linear motion in both a forward and reverse direction without introducing backlash, yet allow the arm to flex in order to reduce stress forces caused by misalignment. The flexure points are formed by removing a sufficient amount of the rigid material at selected regions along the length thereof such that the remaining thickness allows the arm to bend. The coupling arm is ideally suited for applications requiring repeatable precision linear movement, such as a precise XY positioning table.

1 Claim, 5 Drawing Figures

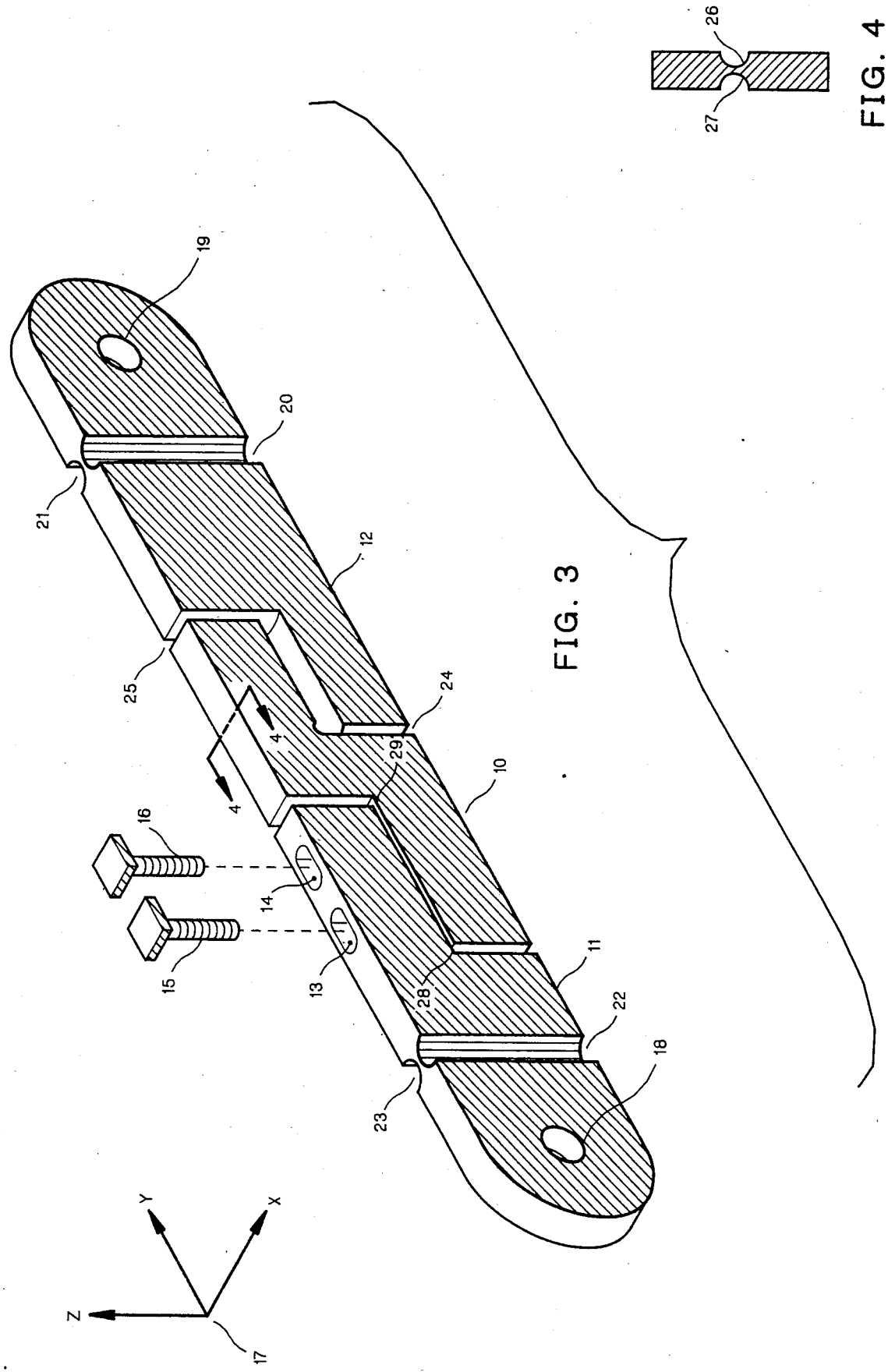

COUPLING ARM FOR TRANSMITTING LINEAR MOTION

BACKGROUND OF THE INVENTION

This invention relates to an arm for coupling a driving mechanism to a driven mechanism for the purpose of transmitting linear motion between the two mechanisms in both a forward and reverse direction. More particularly, it relates to a coupling arm that flexes, without any backlash in the flexing mechanism, to reduce the forces on the moving components caused by misalignment.

There are many types of apparatus where a driving mechanism moves with a linear motion in both a forward and a reverse direction to move a driven mechanism to a desired position. One such example is an XY positioning table, wherein the table can be moved in the plus and minus X direction and the plus and minus Y direction to position an object on the table. Such XY tables are widely used, e.g., in automated milling equipment, photoplotters, electron beam systems used to expose integrated circuit patterns, equipment for automatically inserting electronic components in printed circuit boards, etc.

An XY positioning table typically consists of two movable platforms. Two parallel rails, or slides, are mounted on a base and one of the platforms is mounted on the rails by some suitable friction reducing mechanism, such as ball bearings, roller bearings, etc., near each end of the plaftform. A second set of parallel slides is mounted on the first platform and the second platform is mounted on these slides, again using some suitable friction reducing mechanism. The two sets of slides typically are mounted at right angles to each other such that one platform can move in a defined X direction and the other in a defined Y direction.

Each platform is mechanically connected to a drive motor by some type of coupling arm. The drive motor and associated driving mechanism can cause the platform to which they are connected to move in either the plus or minus direction. Usually, an XY table is electronically controlled and a position sensing detector (or detectors) provides a position signal to a servo controller which automatically moves the two platforms in their respective directions such that the object mounted on the top platform is moved to the desired XY position.

Unfortunately, there is always some misalignment in a mechanical system of the type described above. This misalignment is typically the result of tolerance build-up in the fabricating and assembly process. For example, the slides may not be exactly straight, the slides may not be exactly parallel, the driving mechanism may not drive exactly in the same line in which the platform is moving, etc. Such misalignment may not necessarily be linear along the travel of the platform. For example, the slides may have slight bows in them such that at some points there is more friction between the slides and the bearings than at other points. The result of this friction is wear on the slides and the bearings. If enough wear occurs, the positioning accuracy of the XY table can be significantly affected.

In the prior art, this misalignment is handled in one of two ways. If the misalignment is negligible, then no corrective action is taken. This would be the case when the position error caused by the eventual wear is less than the rated positional error of the XY table.

However, in a "precise" XY table, corrective action is always taken. The XY table in an electron beam system used to expose circuit patterns in the fabrication of integrated circuits is an example of a precise XY table. The servo controller, using a laser interferometer as the position measuring device, can position the XY table to an accuracy of 0.20 microns (0.8 microinch). Circuit patterns, with dimensions and spacings on the order of a micron, are exposed on masks. A plurality of different masks are required to fabricate an integrated circuit and the patterns on each mask must be in precise alignment with each other.

A precise XY table is built using the tightest fabrication and assembly tolerances that are practical. As explained previously, there will still be misalignment within the mechanical assembly but it will be reduced to a practical minimum. If the driving mechanism is rigidly coupled to its platform, additional forces, and therefore friction and wear, are generated as the platform is forced through the points of misalignment. The result of this wear is that a given point on the positioned XY table, will move with respect to its location before the wear.

To assist in understanding how the location of a point on an XY table can move due to wear while the table is being positioned with an accuracy of 0.02 microns, consider the following example, which is given only for illustrative purposes: The lower platform moves in the X direction and the X driving mechanism is one degree out of alignment with the platform. After a sufficient amount of time, the slides of the X platform have worn until the platform is in alignment with the driven mechanism, i.e., rotated one degree from the original position. The upper platform, which moves in the Y direction, has no misalignment, and therefore no wear, is thus also rotated one degree. The servo controller, using the laser interferometer to measure position, will position the table to the desired XY coordinate with an accuracy of 0.02 micron. However, the electron beam is deflected in a coordinate system that is independent of the coordinate system of the XY table. Thus, the pattern exposed by the electron beam, about the XY point at which the table is positioned will be rotated one degree from what it was before the wear occurred.

While the above example is highly improbable, it illustrates the problem of the wear caused by the misalignment. Since, in reality, the misalignment is not linear, the wear will occur at localized points along the X and Y rails. The resulting errors in position can, of course, be in any direction, X, Y, or Z, or combinations thereof, at the points of wear.

Since misalignment is inherent in an XY table, the correction mechanism used in the prior art is to allow the coupling mechanism which couples the driving motor to the platform to "float". A floating coupling arm can transmit linear motion but can also flex, or bend, in at least one axis, to reduce the forces applied by the driving mechanism at the points of misalignment.

Typical flexing mechanisms used in the prior art are the hinge, the U-joint, and the ball and socket. Regardless of the type of mechanism used, they comprise two parts mechanically coupled together in such a way as to be able to move with respect to each other in one or more axis while transmitting a linear motion.

Unfortunately, since it is physically impossible to make the parts of the flexing mechanism that mate with each other exactly the same size, such floating mechanisms, or flexures, always have an inherent backlash. That is, when the direction of motion is reversed, one of the two parts will move a finite amount before the mating means causes the other part to move. Disadvantageously, this backlash causes wear in the flexing mechanism. As the wear in the mechanism increases, the servo system response time can increase, depending upon the type of servo system used, as it moves the mechanism back and forth through the backlash while attempting to move the platform to the desired position. The backlash can also cause an error in position of the object being moved, again dependent upon the type of servo system used, by reducing the positional accuracy of the servo system. When the wear in the flexing mechanism becomes too great, it must be replaced.

From the above discussion it is apparent that a need exists in the art of precise XY positioning tables for a coupling arm between the driving mechanism and the driven mechanism that has no backlash and that can flex to reduce the forces caused by the misalignment inherent in the two mechanisms.

SUMMARY OF THE INVENTION

A first objective of the present invention is to provide an improved coupling arm for transmitting linear motion between a driving mechanism and a driven mechanism in a mechanical system where the position of the driven mechanism is precisely controlled. A second objective of the invention is to provide such a coupling arm which can flex to reduce the unwanted forces caused by the inherent misalignment of the components of both mechanisms. A third objective of the invention is to provide such a coupling arm that can flex and move in both directions without any backlash.

The above and other ojects, features, and advantages of the invention are realized with a length of suitable rigid material which is formed into the coupling arm. Each end of the coupling arm is machined or fitted to provide the appropriate interface for connection to the driving mechanism and to the driven mechanism. Flexure points are formed in the coupling arm between the two interfaces. The direction of the flexure and the quantity of flexures is determined by the particular application for which the coupling is used. A flexure is formed by machining two grooves, one on either side of the length, directly opposite or juxtaposed from each other. The two grooves are in line with each other. The thickness of the material left between the two grooves is designed so as to have the strength necessary to transmit linear motion but thin enough to flex the amount required by the application.

Advantageously, the flexing of the coupling arm allows the driven mechanism to be driven through the localized points of misalignment that are inherent in any mechanical assembly without the forces that would be applied by a more rigid coupling arm. This reduces the undesirable wear on the driven mechanism, which wear eventually affects the accuracy with which the driven mechanism can be positioned. Although there is still friction, and therefore wear, at the localized points of misalignment, the flexible coupling arm, by reducing the forces, also reduces the wear, and thereby extends the life of the assembly. The flexure points placed in the coupling arm are unique in that they are formed from a single piece of material. Thus, the flexures have no backlash and no wear which can affect the positional accuracy of the mechanical system.

BRIEF DESCRIPTION OF THE DRAWINGS

The above and other objects, features, and advantages of the present invention will become more apparent from the following description of the preferred embodiment, which is described with reference to the following drawings, wherein:

FIG. 3 is a perspective drawing of the coupling arm of the present invention;

FIG. 4 is a cross sectional view of the coupling arm of FIG. 3 taken along the line 4—4.

DESCRIPTION OF THE PREFERRED EMBODIMENT

The following is a description of the best presently contemplated mode of carrying out the present invention. This description is given only for the purpose of illustrating the general principles of the present invention and should not be taken in a limiting sense. The true scope of the invention can be ascertained by referring to the appended claims.

Figure 1:
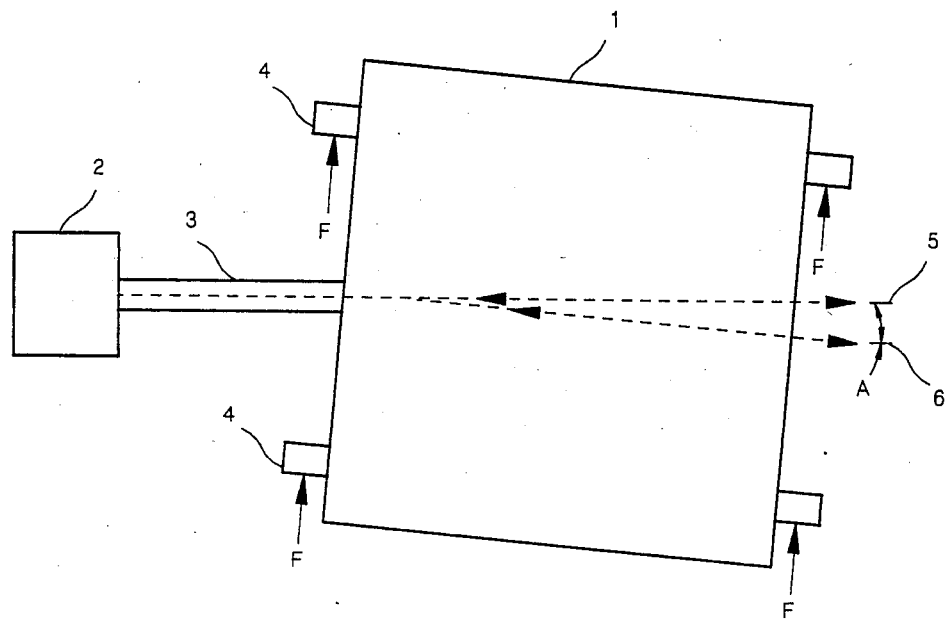
FIG. 1 is a plan view drawing showing a driven platform which is out of alignment with the driving mechanism.

Referring to FIG. 1, a platform 1 of an XY table is connected to a driving mechanism 2 by a coupling arm 3. The details of the driving mechanism are not shown since they are not claimed as part of the invention. The platform 1 is free to move on the slides 4 in the directions indicated by the line 6. The driving mechanism 2 attempts to move the coupling arm 3 in the directions indicated by the line 5. Because of misalignment, the two lines 5-6 are out of alignment by an angle A.

If the coupling arm 3 is rigid, forces F are generated between the bearings (not shown in the figure) and the slides 4 as the platform 1 moves in the direction indicated by the line 6 as the driving mechanism 2 attempts to move it in the direction indicated by the line 5. Additionally, forces (not shown in the figure) would be generated within the driving mechanism 2. These forces cause friction which results in wear on the components involved.

Figure 2:
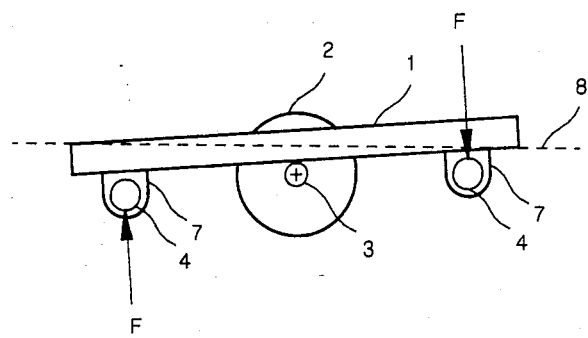
FIG. 2 is an end view drawing showing a driven platform which is titled with respect to the intended plane of travel.

FIG. 2 is an end view drawing showing the platform 1 titled from the intended plane of travel 8. If the coupling arm 3 is rigid, forces F would be generated between the bearings 7 and the slides 4 as the driving mechanism 2 moves the platform 1. Again, these forces result in wear on the components involved.

FIGS. 1 and 2 are shown to illustrate how misalignment can cause forces which result in friction and wear. In a precise XY table, the examples shown in the figures might occur because of the physical impossiblity of eliminating all misalignment in a mechanical assembly, but the amount of misalignment would be very small. Also, because of mechanical tolerances, the misalignment shown in FIG. 1 would not be linear as shown, but would vary along the length of the slides 4. Therefore, larger friction would occur at certain points of movement of the platform 1 than at other points. As explained previously, the wear eventually affects the accuracy to which the object on the XY table can be positioned.

FIG. 3 is a perspective drawing of the improved coupling arm of a preferred embodiment of the present invention. To aid in the description of the figure, the coordinate axes, X, Y and Z are represented by the lines 17. Two lengths 11-12 of suitable material, e.g., stainless steel, are machined in the manner shown. The length 11 has a right angle step 28 machined at one end while the length 12 has an opposing right angle step 29 machined at one end. The length 11 has two elongated holes 13-14 drilled in the Z direction while the length 12 has two tapped holes (not shown in the figure) on the same centers as the elongated holes 13-14.

The coupling arm 10 is made by positioning the two lengths 11-12 as shown and putting the threaded bolts 15-16 through the elongated holes 13-14, respectively, into the threaded holes of the length 12. The elongated holes 13-14 allow the overall length of the arm 10 to be adjusted. When the proper length is attained, the bolts 15-16 are tightened to form a rigid assembly. Other embodiments exist without this adjustable feature, that is, the coupling arm is made from a single piece of material.

The holes 18 and 19 are used to connect the arm 10 to the driving mechanism and to the mechanism to be driven respectively. A single hole is shown at each end for simplicity since the exact method used to connect the coupling arm to the driving mechanism and to the driven mechanism is not critical to the invention. When connected, the coupling arm 10 will transmit linear motion in the plus and minus Y-direction of the figure.

A pair of grooves 22-23 are machined near the hole 18 and a second pair of grooves 20-21 are machined near the hole 19. These grooves are machined in the Z-direction, leaving a thin amount of material in the X-direction.

Advantageously, the grooves 20-21 and 22-23 form flexures that have no backlash. When the coupling arm 10 is used, the driving mechanism and the driven mechanism can both move in the Y-direction, even though their lines of motion are offset in the X-direction. The coupling arm 10 will bend at the flexure points 20-21 and 22-23, as required, to transmit a linear motion between the two mechanisms without undue forces in the X-direction. Advantageously, since there are no moving parts in the flexures 20-21 and 22-23, there is no backlash when the direction of motion is changed.

FIG. 3 also shows a second feature of the flexure of the invention. Two slots 24-25 are machined in the plus and minus Z-direction, respectively, in the coupling arm 10. A pair of grooves 26-27 in the Y-direction connect the slots 24-25 (see FIG. 4). The pair of grooves 26-27 form a flexure point which allows rotation about the Z-axis. That is, if the driven mechanism is misaligned in the Z-direction, the coupling arm 10 can flex in the Z-direction at the flexure 26-27 to reduce the forces caused by the misalignment.

Figure 5:
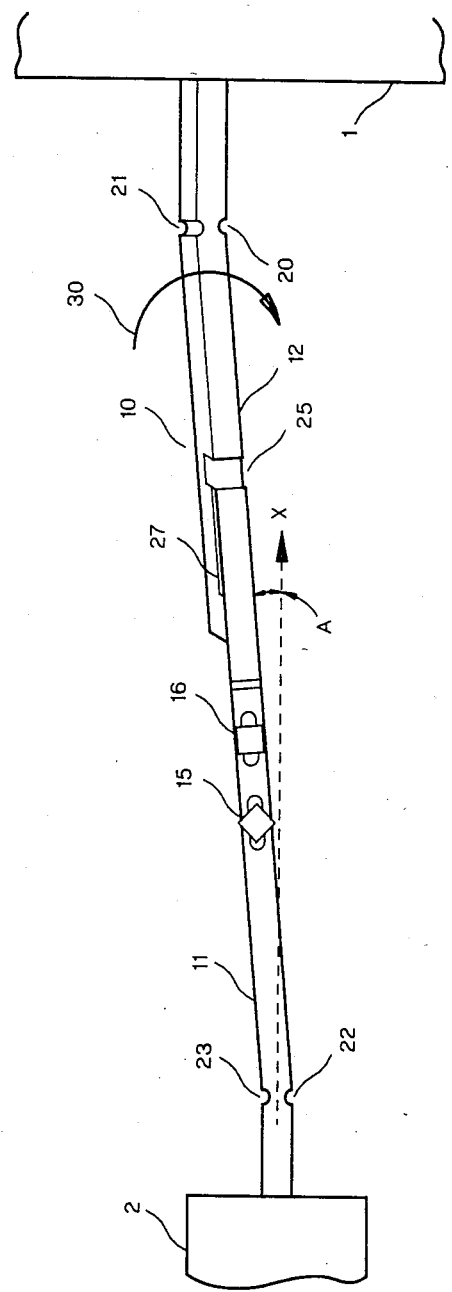
FIG. 5 is a plan view drawing showing how the coupling arm of the present invention can flex to reduce the forces caused by misalignment.

FIG. 5 is a top view showing how the coupling arm can flex to reduce the forces caused by misalignment. A driving mechanism 2, which moves in the plus and minus X-direction, is connected to the driven platform 1 by the coupling arm 10. However, due to misalignment, the platform 1 is not aligned in the X-direction with the driving mechanism 2. The flexure points 22-23 and 20-21 flex such that the portion of the coupling arm 10 between the two flexure points is at an angle A with respect to the X-axis.

The platform 1 of FIG. 5 is also tilted (FIG. 2 illustrates tilt). The flexure 26-27 (the groove 26 is on the backside and therefore not visible in the figure) flexes such that the portion 12 of the coupling arm 10 is rotated, as shown by the arrow 30, with respect to the arm section 11.

FIG. 5 illustrates the advantages of the present invention. The coupling arm, by the use of the unique flexures, transmits linear motion between the driving mechanism and the driven mechanism without causing undue forces at the points of misalignment which would be created if the coupling arm were rigid. Since the flexures have no moving or mating parts, the direction of travel can be reversed without the backlash inherent in flexures of the prior art.

While the invention herein disclosed has been described by means of a specific embodiment and application thereof, numerous modifications and variations could be made thereto without departing from the spirit and scope of the present invention. It is therefore to be understood that within the scope of the appended claims, the invention may be practiced otherwise than as specifically described herein.

What is claimed is:

1. In a mechanical system where a driving mechanism imparts a moving force comprising linear motion in both a positive and a negative direction to a driven mechanism, and where the moving force applied by said driving mechanism is not precisely aligned with the direction of movement of said driven mechanism, a coupling arm for transmitting said moving force, said coupling arm exhibiting no backlash when said direction of movement is changed, said coupling arm comprising:

a length of rigid material comprising a rigid rod having a rectangular cross sectional shape;

first connection means formed on a first end of said length of material for connecting to said driving mechanism;

second connection means formed on a second end of said length of material for connecting to said driven mechanism;

flexure means, for allowing said coupling arm to flex in a desired direction, formed at a plurality of locations along said length of rigid material by placing a groove at a selected location along the length of said rod, the bottom of said groove defining a thickness of said rod that allows said rod to bend along a line defined by said groove, said flexure means being formed by removing said material at a desired location along the length of said material until the amount of material remaining at said location is flexible and wherein the grooves of adjacent flexure means along the length of said rod run in directions that are substantially orthogonal to each other.

* * * * *